United States Patent [19]

Palaniswami

[11] Patent Number: 5,195,051

[45] Date of Patent: Mar. 16, 1993

[54] COMPUTATION OF SIGN BIT AND SIGN EXTENSION IN THE PARTIAL PRODUCTS IN A FLOATING POINT MULTIPLIER UNIT

[75] Inventor: Krishnan J. Palaniswami, Austin, Tex.

[73] Assignee: Intel Corporation, Santa Clara, Calif.

[21] Appl. No.: 861,078

[22] Filed: Mar. 31, 1992

[51] Int. Cl.[5] .............................................. G06F 7/38
[52] U.S. Cl. ................................................... 364/748
[58] Field of Search ................ 364/760, 757, 754, 748

[56] References Cited

U.S. PATENT DOCUMENTS

| | | | |
|---|---|---|---|
| 4,748,582 | 5/1988 | New et al. | 364/757 |
| 5,038,315 | 8/1991 | Rao | 364/760 |
| 5,144,576 | 9/1992 | Briggs et al. | 364/754 |

Primary Examiner—Long T. Nguyen
Attorney, Agent, or Firm—Owen L. Lamb

[57] ABSTRACT

An arithmetic logic for selectively multiplying either floating point numbers and unsigned integers or signed integers. A signed integer request signal has a first state indicating a floating point or unsigned integer operation and a second state indicating a signed integer operation. A multiplicand operand includes a most significant bit (MSB) of the multiplicand. A Booth encoder provides at an output of the Booth encoder a booth encoded set having a plurality of bits, including a most significant bit (MSB) of the booth encoded set. A partial product generator connected to the multiplicand operand and to the Booth encoder output generates a plurality of partial products. A carry save adder (CSA) connected to the partial product generator generates a sum vector and a carry vector. An exclusive OR has one input connected to the MSB of the Booth encoded set and another input connected to the MSB of the multiplicand. A 2:1 MUX is connected to the MSB of the Booth encoded set and to the exclusive OR. The signal integer request signal input to the MUX selects the MSB of the Booth encoded set upon the condition that the signal integer request signal is in the first state and for selects the output of the exclusive OR upon the condition that the signed integer request signal is in the second state.

1 Claim, 4 Drawing Sheets

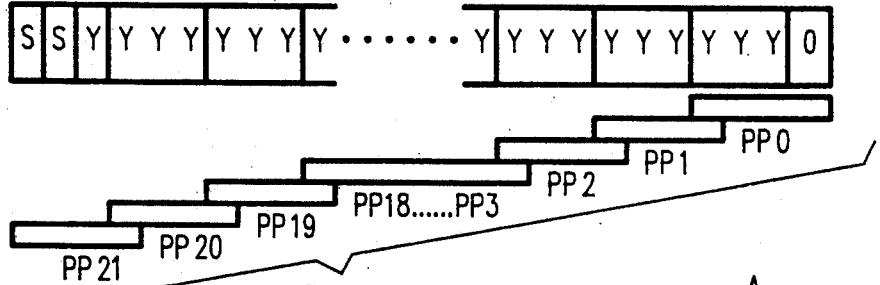
FIG. 2 PRIOR ART
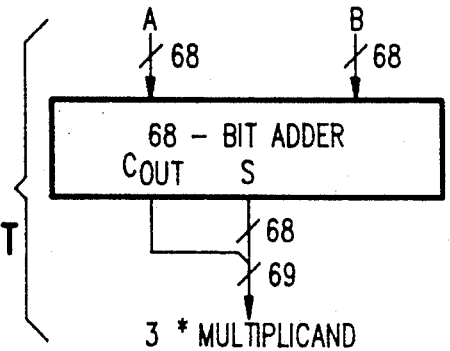
FIG. 3 PRIOR ART
FIG. 4
NOTE: MULTIPLICAND' = 3 * MULTIPLICAND

COMPUTATION OF SIGN BIT AND SIGN EXTENSION IN THE PARTIAL PRODUCTS IN A FLOATING POINT MULTIPLIER UNIT

CROSS REFERENCES TO RELATED APPLICATIONS

This application is related to copending patent application Ser. No. 07/861,077 filed Mar. 31, 1992 of Krishnan J. Palaniswami, entitled "Computation of Sticky bit in parallel with Partial Products in a Floating Point Multiplier Unit," and Ser. No. 07/860,077 filed Mar. 31, 1992, of Jack T. Poon, entitled "Floating Point to Integer Conversion in a Floating Point Adder;" both assigned to Intel Corporation, the assignee of the present invention.

BACKGROUND OF THE INVENTION

1. Field of the Invention

The present invention relates to data processing systems, and more particularly to apparatus for the computation of sign bit and sign extension in the floating-point unit of a microprocessor.

2. Background Art

U.S. Pat. No. 4,823,260 of Imel et al. describes a microprocessor and a floating-point unit in the processor that implements the IEEE microprocessor floating-point standard P754. Extended-precision floating-point calculations are performed by using 32-bit, 64-bit, and 80-bit real values.

The 80-bit real values are used internally by 80-bit floating-point registers for extremely high-precision calculations. Ordinarily this arithmetic capability would require separate op codes for each instruction which specifies a floating-point data type. This would ordinarily result in a number of separate op codes in order to achieve all possible combinations of floating-point-data types.

The above-cited patent reduced the number of floating-point simplified the programming, thereby increasing the performance of the floating-point operations by providing an apparatus for performing a number of kinds of mixed-precision calculations utilizing a single-instruction op code. The advantage is that mixed-precision arithmetic is supported as well as extended-precision arithmetic. Mixed-precision arithmetic avoids extra conversion instructions, allows computation of the result to sufficient precision instead of the widest precision and does not occur double-rounding in the arithmetic operation if the intermediate result is rounded to extended precision first.

A signed bit located at the high-order bit of a numeric representation contains an indication of the algebraic sign of the number stored in the remaining bits. Sign extension performs a data conversion to a larger format in which extra-bit positions are filled with the value of the sign to thereby preserve the value of signed integers.

In the above Imel. et al. patent, signed and unsigned integer multiply is not done in the floating-point unit. Since the floating-point multiply and the integer multiply do not share the same hardware, a large die size results.

It is an object of the present invention to provide a floating-point-unit in which floating-point multiply and signed and unsigned integer multiply share the same hardware.

SUMMARY OF THE INVENTION

Briefly, the above object is accomplished in accordance with the invention by providing an arithmetic logic for selectively multiplying either floating point numbers and unsigned integers or signed integers. A signed integer request signal has a first state indicating a floating point or unsigned integer operation and a second state indicating a signed integer operation. A multiplicand operand includes a most significant bit (MSB) of the multiplicand. A Booth encoder provides at an output of the Booth encoder a booth encoded set having a plurality of bits, including a most significant bit (MSB) of the booth encoded set. A partial product generator connected to the multiplicand operand and to the Booth encoder output generates a plurality of partial products. A carry save adder (CSA) connected to the partial product generator generates a sum vector and a carry vector. An exclusive OR has one inout connected to the MSB of the Booth encoded set and another input connected to the MSB of the multiplicand. A 2:1 MUX is connected to the MSB of the Booth encoded set and to the exclusive OR. The signed integer request signal input to the MUX selects the MSB of the Booth encoded set upon the condition that the signed integer request signal is in the first state and for selects the output of the exclusive OR upon the condition that the signed integer request signal is in the second state.

The invention has the advantage that the floating-point multiply and the integer multiply sharing the same hardware together with the elimination of sign extension of partial products saves approximately 7% of die area.

BRIEF DESCRIPTION OF THE DRAWINGS

The invention will be apparent from the following more particular description of the preferred embodiment of the invention as illustrated in the accompanying drawings, wherein:

FIG. 2 is a diagram of the Booth decode of the 64-bit multiplier of FIG. 1;

FIG. 3 shows the various forms of multiplicand that result from generation of partial products;

FIG. 4 is a diagram of a 68-bit adder is used to compute the 3* multiplicand of FIG. 3;

DESCRIPTION OF THE PREFERRED EMBODIMENT

The Intel 80486 microprocessor stores real numbers in a three-field binary format similar to exponential notation. The significant bits of the number are stored in the significant field. An exponent field locates the binary point within the significant digits to determine the number's magnitude. A sign field indicates whether the number is positive or negative.

The concept of floating point operation is described in the book "Introduction to Arithmetic for Digital Systems Designers," by Waser and Flynn, 1982, CBS College Publishing.

Figure 1:
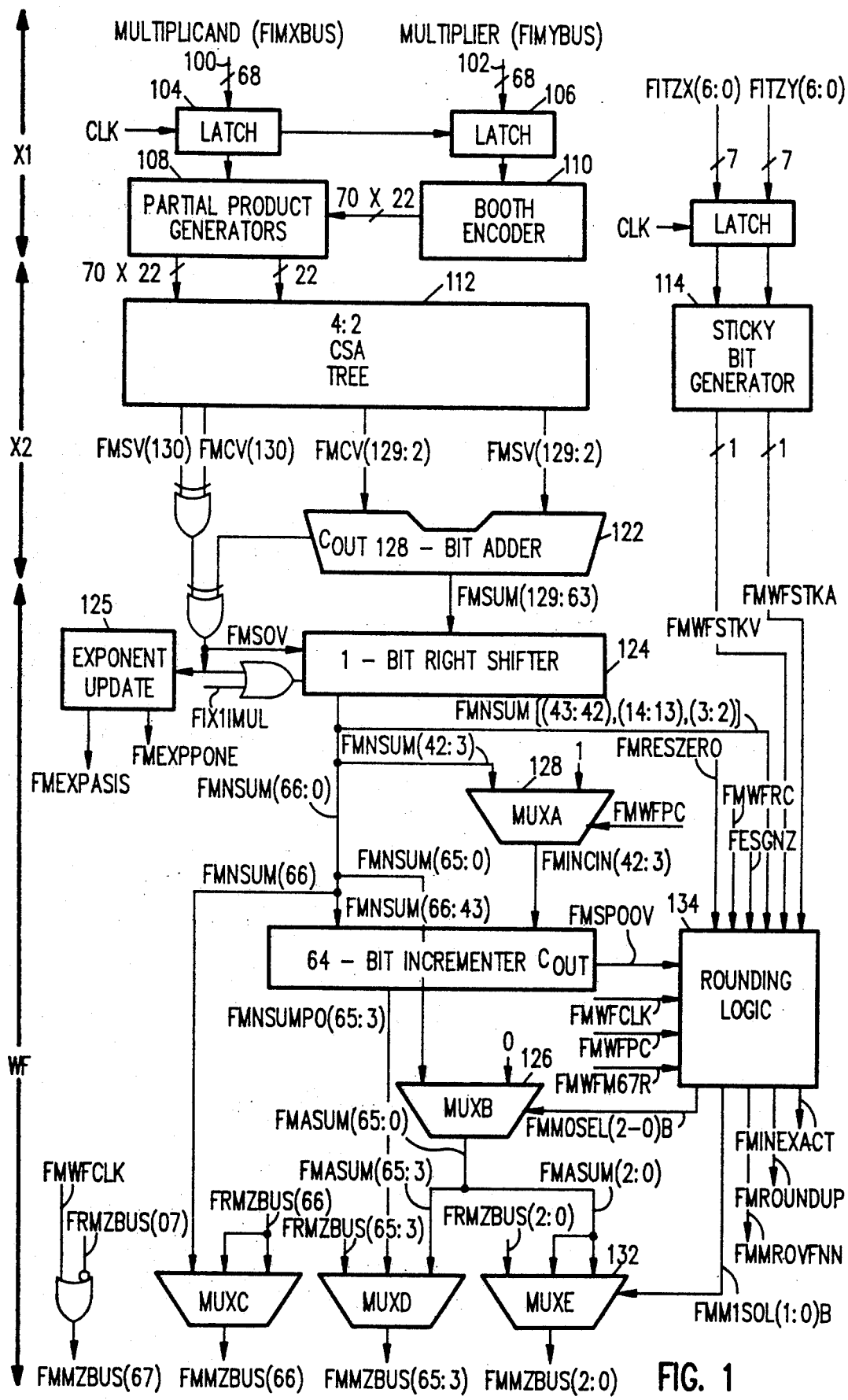
FIG. 1 is a block diagram of a floating point multiply unit in which the invention is embodied.

FIG. 1 shows the general organization of the floating point multiplier in which the present invention is embodied. In the X1 stage, the floating point multiplier section generates 22 partial products by booth encoding the 64-bit multiplier (102). In the X2 stage, the partial products are fed into a 4:2 CSA (Carry Save Adder) tree (112) for further reduction, eventually producing two vectors called the sum and carry vectors. In the WF stage, these sum and carry vectors are added to compute the final product. Also, rounding is performed, depending on the precision control and rounding mode, using a dedicated rounder (134). The rounded result is then written back onto the result bus at end of WF clock.

The X1 stage consists of booth encoders and partial product generators. The inputs to these blocks are the 67-bit multiplicand (100) and 64-bit multiplier (102). The Booth encoder (110) generates five different select signals corresponding to five different types of multiplicands. It also generates partial product sign complement and negate bits. The partial product generator (108) produces 22 70-bit partial products and 22 sign-bit signals to be used in the X2 stage. Also, the trailing zero encoders produce two 7-bit encoded values that give the number of trailing zeros in the 67-bit multiplicand and 64-bit multiplier.

The X2 stage consists of a 4:2 CSA tree (112) and a sticky-bit generator (114). The inputs to the CSA tree are the partial products. The tree generates two vectors as outputs called the sum and carry vectors each of which is 131-bits wide. A special 129-bit adder (122) computes the 129-bit sums using the upper-129 bits of sum and carry vectors. This adder is divided into two portions, namely group generate/propagate block and 129-bit summation block. Group generate/propagate block (116) computes the carry-look-ahead portion of the upper 129-bit sum. A full 131-bit sum is not needed because the two least-significant bits in the carry vector are guaranteed to be zero. The sticky-bit generator computes the sticky bit for different precisions in X2 stage. Two different sticky-bit values are computed, one when the value of the unrounded product is between 2 and 0, and the other between 4 and 2, inclusive. The output of this block is the actual value of sticky bits to be used in WF stage.

The WF stage logic consists of a 129-bit summation block, normalizer, a 64-bit incrementer (130), two different mux blocks, and rounding logic (134). The 129-bit summation unit (112) computes the 129-bit sum using the output of the group generate/propagate block, which is latched at the rise of WF clock. The normalizer is a 1-bit right shifter (124) that shifts the rounded result if the value of the unrounded result is between 4 and 2, inclusive. The 64-bit incrementer generates a result equal to the unrounded result plus one. One of the mux blocks (128) is used to replace the lower insignificant bits to the input of the incrementer with ones based on the precision mode. The other mux block (126) replaces the lower insignificant bits in the normalized result with zeros based on the precision mode of floating point multiplier operation. The rounding logic (134) evaluates round condition based on the precision and round mode, sign of the floating point multiplier result, value of LSB, round and sticky bits, and type of multiply operation. The signal, FMMROVFNN indicates rounding overflow. The 3:1 mux (132) at the output of the WF stage logic selects either the normalized result or the incremented result or the result from a rounding unit.

X1 Stage Logic

The X1 stage logic include the booth decoders and partial product generators. The booth decoders (110) obtain the input from the FIMYBUS and generate output control signals FM0XSEL, FM1XSEL, FM2XSEL, FM3XSEL, and FM4XSEL that select one of five possible types of multiplicand values in the partial product generator (108). FMNEG negates one of four multiplicand values selected depending on the bit pattern decoded. FMSGNNN is the sign-bit complement of the partial products. The partial-product generators compute various forms of multiplicands, namely 0 multiplicand, 1* multiplicand, 2* multiplicand, 3* multiplicand, and 4* multiplicand.

Booth Decoders

The floating point multiplier decodes the multiplier in sets of four bits with one bit from the previous set. There are altogether 22 partial products, the last partial product being generated either by appending two zero bits at the left if the operation is either floating-point or unsigned integer multiplication, or by sign-extending the most significant bit of the multiplier to the left by two bits if the operation is signed integer multiplication. The multiplier bits are decoded by looking at four bits at a time. Three most-significant bits come from the present set and the least-significant bit comes from the previous set as shown in FIG. 2. Also, the first partial product is generated by decoding only least-significant three bits since the least-significant bit is always considered zero. TABLE II shows the bit patterns that are required to generate different multiplicand forms.

In FIG. 2:

PP21-PP0 = Bit sets used for generating partial products
Y = Multiplier bits
S = 0, if the operation is either floating-point or unsigned-integer multiplication
S = $Y_{63}$, if the operation is signed-integer multiplication TABLE II shows the computation of partial-product sign complement and negate bits based on value of the most-significant bit in the 4-bit booth-encoded set, value of the most-significant bit of the multiplicand, type of multiply request, and the 0* multiplicand-select signal.

The signal, FMSGNNN is the partial-product sign complement. The signal FMNEG implies that the negated version of the corresponding multiplicand be used in generating partial products.

Partial Product Generators

FIG. 4 shows the various forms of multiplicand that result from generation of partial products, where multiplicand' = 3* multiplicand. A 68-bit adder is used to compute the 3* multiplicand as shown in FIG. 3.

If the type of multiply request = signed integer, then:

| A = | $X_{66}$ | $X_{66}$ | $X_{65}$ | $X_{64}$ | ... | ... | $X_1$ | $X_0$ | | multiplicand |
|---|---|---|---|---|---|---|---|---|---|---|
| B = | $X_{66}$ | $X_{65}$ | $X_{64}$ | ... | ... | | $X_1$ | $X_0$ | 0 | 2*multiplicand |
| S = | $X_{67}$ | $X_{66}$ | $X_{65}$ | $X_{64}$ | ... | ... | $S_1$ | $X_0$ | | |
| else | | | | | | | | | | |
| A = | 0 | $X_{66}$ | $X_{65}$ | $X_{64}$ | ... | ... | $X_1$ | $X_0$ | | multiplicand |
| B = | $X_{66}$ | $X_{65}$ | $X_{64}$ | ... | ... | | $X_1$ | $X_0$ | 0 | 2*multiplicand |
| S = | $X_{67}$ | $X_{66}$ | $X_{65}$ | $X_{64}$ | ... | ... | $S_1$ | $X_0$ | | |

Control signals, FMSEL0B–FMSEL4B come from the booth encoders. The complement of the sign bit gets appended to the multiplicand at the most-significant bit location. Negative versions of partial products are obtained by negating the multiplicand and adding a one at the first positions of the next partial product during partial-product reduction done in the X2 stage. Also, the last partial product (22) is always positive for either unsigned integer of floating-point multiplication.

The partial products are twos-complement numbers. Hence, they are sign-extended before they are fed into the CSA tree. The sign-extension process is greatly reduced by a special technique which is an extension of the method discussed in "The design of a Booth Multiplier: nMOS vs CMOS Tech." by M. Annaratone and W. Z. Shen, IEEE Journal of Solid-state circuits, October 1986. This special technique involves replacing the sign bit of the partial products by two ones and complementing the sign bit for all the partial products as shown in TABLE I below, where $S_1$, $S_2$, and $S_3$ are the sign bits of the partial products. This results in the elimination of sign-extension in partial products.

TABLE I

| Sign-extension Method | Sign-generate Method |
|---|---|
|  | 1 |
| $S_1 S_1 S_1 S_1$ partial product 1 | 1  1  $S_1$  partial product 1 |
| $S_2 S_2 S_2$ partial product 2 | 1  1  $S_1$ |
| $S_3 S_3$ partial product 3 partial product 4 | 1  1  $S_3$ partial product 3 partial product 4 |

TABLE II is a table of partial product sign complement and negate bit generation. In the floating point multiplier, the sign bit is fixed depending on the type of multiplicand for unsigned integer or floating-point multiplication as shown in FIG. 4. In the case of signed-integer multiplication, the sign bit is determined as shown in TABLE II (column corresponding to FMSGNNN). The appending of these 2 ones is done in the CSA tree (X2 stage). A one is also added at the position of the sign bit of first partial product. This 1-bit addition is also done in X2 stage. Eliminating sign extension of partial products saves area considerably (equivalent 7.0%).

TABLE III

| $Y_{i+2}$ | $Y_{i+1}$ | $Y_i$ | $Y_{i-1}$ | Partial Product |
|---|---|---|---|---|
| 0 | 0 | 0 | 0 | +0X |
| 0 | 0 | 0 | 0 | +1X |
| 0 | 0 | 1 | 0 | +1X |
| 0 | 0 | 1 | 1 | +2X |
| 0 | 1 | 0 | 0 | +2X |
| 0 | 1 | 0 | 1 | +3X |
| 0 | 1 | 1 | 0 | +3X |
| 0 | 1 | 1 | 1 | +4X |
| 1 | 0 | 0 | 0 | −4X |
| 1 | 0 | 0 | 1 | −3X |
| 1 | 0 | 1 | 0 | −3X |
| 1 | 0 | 1 | 1 | −2X |
| 1 | 1 | 0 | 0 | −2X |
| 1 | 1 | 0 | 1 | −1X |
| 1 | 1 | 1 | 0 | −1X |
| 1 | 1 | 1 | 1 | −0X |

X2 Stage Logic

The 22 partial products obtained from X1 stage logic are reduced to two vectors called sum and carry vectors in this stage by the 4:2 CSA tree. These two vectors are then added partially, i.e., group propagate and generate terms are generated for these two vectors. These are then latched at the rise of WF clock to compute the summation in the WF stage.

4:2 CSA Adder and Tree

Figure 5:
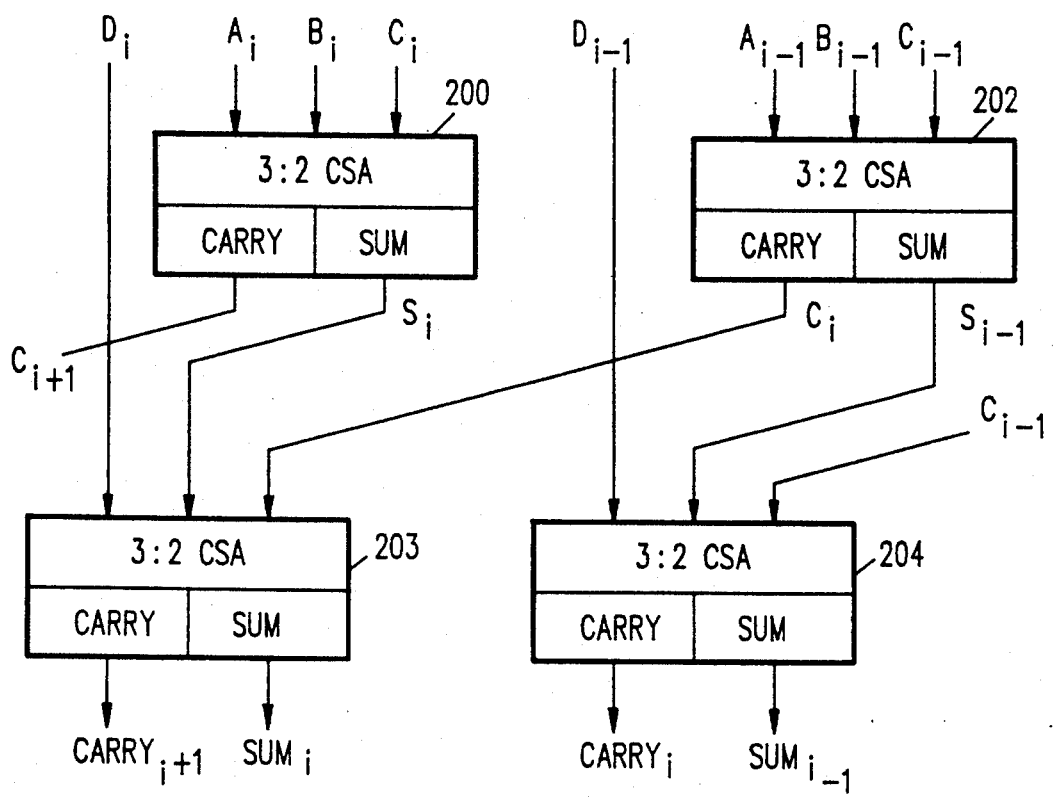
FIG. 5 is a diagram of the 4:2 CSA tree adder of FIG. 1.

The 4:2 CSA adder Tree (112) shown in FIG. 1 is a combination of back-to-back 3:2 CSA adders. FIG. 5 shows how a 4:2 CSA adder is constructed out of 3:2 CSA adder. The sum logic in part of first 3:2 CSA adder (200), carry logic in part of second 3:2 CSA adder (202) and third full 3:2 CSA adder (203) constitute one 4:2 CSA adder, where the output is $SUM_i$ and $CARRY_{i+1}$.

Figure 7:
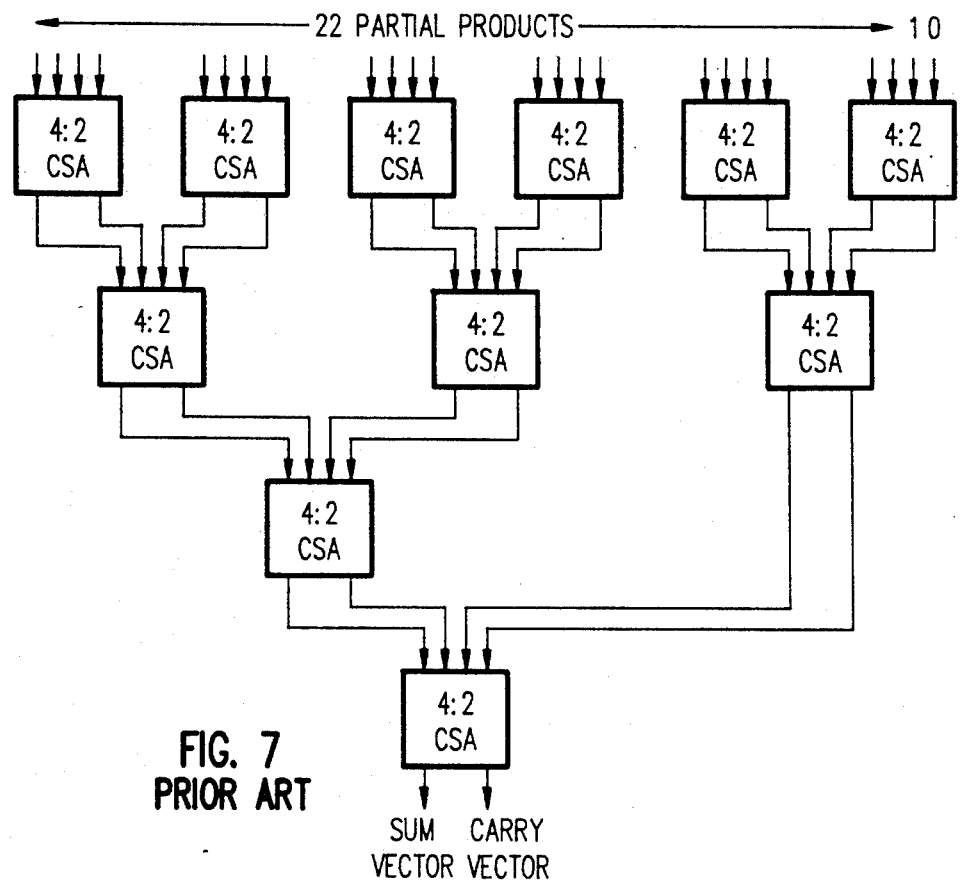
FIG. 7 is a diagram of the logic using the 4:2 CSA tree adder of FIG. 5 used to reduce the partial products to the sum and carry vectors; and, FIG. 8 is a diagram illustrating partial product reduction using the 4:2 CSA tree adder of FIG. 5.

FIG. 7 is a diagram of the logic using the 4:2 CSA tree adder of FIG. 5 used to reduce the partial products to the sum and carry vectors. The tree consists of four levels of 4:2 CSA adders. The additional one bit, is necessary to account for one that needs to be added for the sign-generate algorithm to work as shown in TABLE I. More optimizations are done in the circuit implementation of the 4:2 CSA tree to reduce the transistor count.

Figure 8:
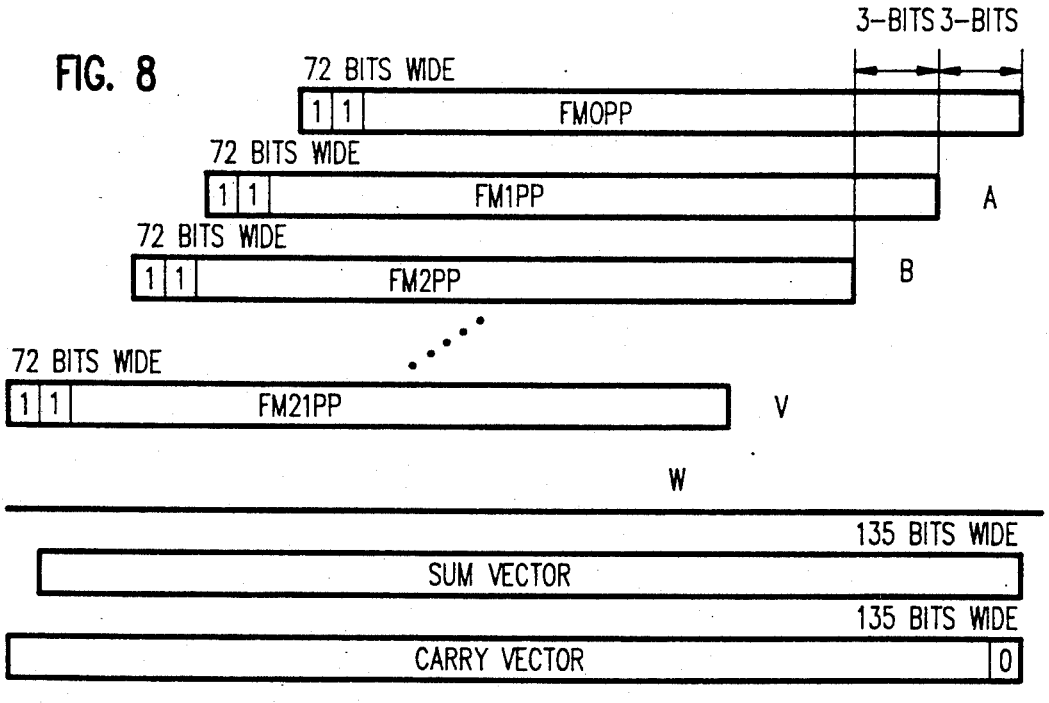

FIG. 8 is a diagram illustrating partial product reduction using the tree adder of FIG. 7 wherein:

TABLE II

| MSB of booth encoded set (FMYBUS) | MSB of multiplicand (FMXBUS) | Signed integer multiply (FISMULI) | 0*Multiplicand select (FMSEL0B) | Partial product sign complement (FMSGNN) | Partial product negate (FMNEG) |
|---|---|---|---|---|---|
| 0 | 0 | 0 | 0 | 1 | 0 |
| 0 | 0 | 0 | 1 | 1 | 0 |
| 0 | 0 | 1 | 0 | 1 | 0 |
| 0 | 0 | 1 | 1 | 1 | 0 |
| 0 | 1 | 0 | 0 | 1 | 0 |
| 0 | 1 | 0 | 1 | 1 | 0 |
| 0 | 1 | 1 | 0 | 0 | 0 |
| 0 | 1 | 1 | 1 | 1 | 0 |
| 1 | 0 | 0 | 0 | 0 | 0 |
| 1 | 0 | 0 | 1 | 1 | 1 |
| 1 | 0 | 1 | 0 | 0 | 0 |
| 1 | 0 | 1 | 1 | 1 | 1 |
| 1 | 1 | 0 | 0 | 0 | 0 |
| 1 | 1 | 0 | 1 | 1 | 1 |
| 1 | 1 | 1 | 0 | 1 | 0 |
| 1 | 1 | 1 | 1 | 1 | 1 | fm0pp − = partial products as obtained from X1 stage.
fm21pp

A-W = fm0pp − fm21pps
= partial product sign as obtained from X1 stage.

The partial products get reduced to two sum and carry vectors using the 4:2 CSA tree. The 2-bit ones that get appended to the most-significant location of each partial product account for the sign-generate-method algorithm. Note that the final sum vector is 135-bits wide while the carry vector is 136-bits wide. The final product that would be computed in WF stage is based on adding the least-significant 131 bits of sum and carry vectors only.

Figure 6:
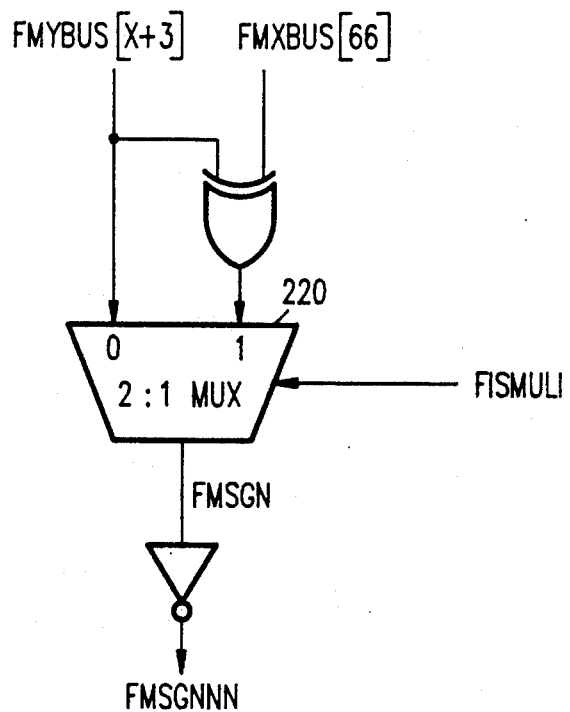
FIG. 6 shows the logic necessary to generate the partial product sign complement of FIG. 4.

FIG. 6 shows the logic necessary to generate the partial product sign complement of FIG. 4. The FMYBUSS[X+3] is the most significant bit (MSB) of the Booth encoded set. The FMXBUS[66] is the MSB of the multiplicand. The FISMULI input is the signed integer multiply request. The output of the MUX (220) is the partial product negate (FMSGN). The final output of this logic is the partial product sign complement (FMSGNNN) shown in TABLE II.

The multiplier is used to generate partial products. If the integer is signed, then the logic has to extend the sign bits to produce the whole partial product. The adder which computes the 3* multiplicand is a kind of partial product used in calculating the result of the multiply. The bit $S_{66}$ has to be repeated. If the operation is signed, then the logic copies $S_{66}$ over to the next higher bit position. If the number is not signed, or a floating point number, then the sign bits are forced to zero and the two numbers (A and B) are added.

The sign complement is computed based on TABLE II and is a function of the MSB of the booth encoded set, the MSB of the multiplicand, the type of integer multiply request, and 0* multiplicand select.

WF Stage

The WF stage consists of a 129-bit adder (112), 1-bit right shifter (124), 64-bit incrementer (130), rounding logic (134), exponent update unit (125) as shown in FIG. 1. The adder needs to add only the upper 129 bits as opposed to 131 bits for the following reasons.

The least-significant two bits of the carry vectors are guaranteed to be zero and hence the corresponding sum-vector bits are the final sum-bits needed. The carry bits that would be generated in the two least-significant positions are propagated to the higher-order-bit positions in the 4:2 CSA tree implementation and hence the value of the corresponding carry-vector bits are zero.

The most-significant sum bit (bit 130) is generated separately using XOR gates. This bit is generated separately to reduce the time overhead involved in carry select of five bits in the last stage of 129-bit adder as opposed to four bits.

Logically, the 1-bit right shifter is a 2:1 mux. The 1-bit right shifter normalizes the unrounded result (sum) from the 128-bit adder only in the event bit 130 is set. Also, in the case of integer multiplication, the shifter always shifts the sum. This is needed because the MSB of the integer product is bit 130 and should appear in the final result. The combination of OR gate together with the signal, FIX1IMUL is used to achieve this shifting in the case of integer multiplication.

Referring to FIG. 1, the signal FMNSUM is the 67-bit normalized sum. A mux replaces the lower-order bits to the inputs of the incrementer with ones based on the precision control. FMWFPC[3], FMWFPC[2], and FMWFPC[0] are signals corresponding to extended-precision, double-precision, and single-precision precision control modes respectively.

Sticky-Bit Generator

The Sticky bit generator is described more fully in the above-identified copending patent application Ser. No. 07/861,077, which is incorporated herein by reference.

While the invention has been particularly shown and described with reference to preferred embodiments thereof, it will be understood by those skilled in the art that the foregoing and other changes in form and detail may be made therein without departing from the scope of the invention.

What is claimed is:

1. An arithmetic logic comprising:
    a signed integer request signal having a first state indicating a floating point or unsigned integer operation and a second state indicating a signed integer operation;
    first means for receiving a multiplicand operand including a most significant bit (MSB) of said multiplicand;
    second means for receiving a multiplier operand;
    a decoder connected to said second means for providing at an output of said decoder a decoded set having a plurality of bits, including a most significant bit (MSB) of said decoded set;
    a partial product generator connected to said first means and to said decoder output for generating a plurality of partial products;
    a carry save adder (CSA) connected to said partial product generator for generating a sum vector and a carry vector;
    an exclusive OR gate having a first input, a second input and an output, said first input being connected to said MSB of said decoded set and said second input being connected to said MSB of said multiplicand; and,
    third means including an output, said third means being connected to said first means, to said output of said decoder, to said output of said exclusive OR gate, and to said signed integer request signal for placing at said output of said third means said MSB of said decoded set in response to said signed integer request signal being in said first state and for placing at said output of said third means said output of said exclusive OR in response to said signed integer request signal being in said second state.

* * * * *

UNITED STATES PATENT AND TRADEMARK OFFICE
CERTIFICATE OF CORRECTION

PATENT NO. : 5,195,051
DATED      : March 16, 1993
INVENTOR(S) : Krishnan J. Palaniswami, et. al.

It is certified that error appears in the above-indentified patent and that said Letters Patent is hereby corrected as shown below:

Title page, item [75]
Inventor:     Add Jonathan Sweedler, Santa Clara, California Title page, item [57]
Abstract:     Col. 2, line 19    Delete "signal"    Insert--signed--

Col. 1, Line 9              Insert--,--    After "1992"

Col. 1, Line 41             After the word "floating-point" insert --
                            operations, and--

Col. 2, Line 19             Delete "inout"    Insert --input--

Signed and Sealed this

Thirtieth Day of November, 1993

Attest:

BRUCE LEHMAN

*Attesting Officer*     *Commissioner of Patents and Trademarks*